(12) United States Patent
Kim

(10) Patent No.: US 8,488,039 B2
(45) Date of Patent: Jul. 16, 2013

(54) DIGITAL IMAGE PROCESSING APPARATUS CAPABLE OF DISPLAYING COLOR DISTRIBUTION CHART AND METHOD OF OPERATING THE SAME

(75) Inventor: Eun-young Kim, Changwon (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 459 days.

(21) Appl. No.: 12/283,371

(22) Filed: Sep. 11, 2008

(65) Prior Publication Data

US 2009/0102941 A1    Apr. 23, 2009

(30) Foreign Application Priority Data

Oct. 23, 2007    (KR) .................. 10-2007-0106736

(51) Int. Cl.
*H04N 5/222*    (2006.01)
*H04N 17/00*    (2006.01)
*G09G 5/00*    (2006.01)

(52) U.S. Cl.
USPC ............ 348/333.02; 348/333.01; 348/333.12; 348/187; 348/188; 345/589; 345/590; 345/591; 345/592; 345/593; 345/594; 345/595; 345/596; 345/597; 345/598; 345/599; 345/600; 345/601; 345/603; 345/604

(58) Field of Classification Search
USPC . 348/187, 188, 333.01–333.12; 345/589–604
See application file for complete search history.

(56) References Cited

U.S. PATENT DOCUMENTS

| | | | |
|---|---|---|---|
| 5,414,537 A * | 5/1995 | Omuro et al. ................. | 358/518 |
| 6,647,141 B1 * | 11/2003 | Li ................................. | 382/162 |
| 7,480,083 B2 * | 1/2009 | Takahashi et al. ........... | 358/474 |
| 7,639,246 B2 | 12/2009 | Lee | |
| 7,756,328 B2 * | 7/2010 | Komiya et al. ............... | 382/164 |

FOREIGN PATENT DOCUMENTS

| | | |
|---|---|---|
| CN | 1921670 A | 2/2007 |
| JP | 11-069186 A | 3/1999 |

OTHER PUBLICATIONS

Office Action established for CN 200810168599.4 (Nov. 3, 2011).
Office Action established for CN 200810168599.4 (Dec. 5, 2012).

* cited by examiner

*Primary Examiner* — Roberto Velez
*Assistant Examiner* — Joel Fosselman
(74) *Attorney, Agent, or Firm* — Drinker Biddle & Reath LLP

(57) ABSTRACT

A digital image processing apparatus capable of displaying a color distribution chart and a method of operating the same is provided. The digital image processing apparatus includes a digital signal processing unit which detects digital color signals from an image input via an image photographing unit and calculates a color distribution chart that indicates a proportion of the detected color signals in the image. The apparatus and method can calculate and display a color distribution chart of a displayed image and change colors of the image into optimized colors.

16 Claims, 9 Drawing Sheets

FIG. 5

| COLOR | SYSTEMATIC COLOR NAME | R | G | B |
|---|---|---|---|---|
| | vivid red | 248 | 000 | 064 |
| ⋮ | ⋮ | ⋮ | ⋮ | ⋮ |
| | vivid orange | 255 | 137 | 000 |
| ⋮ | ⋮ | ⋮ | ⋮ | ⋮ |
| | strong yellow | 249 | 204 | 088 |
| ⋮ | ⋮ | ⋮ | ⋮ | ⋮ |
| | light olive gray | 180 | 176 | 150 |
| ⋮ | ⋮ | ⋮ | ⋮ | ⋮ |
| | vivid green | 180 | 255 | 204 |
| ⋮ | ⋮ | ⋮ | ⋮ | ⋮ |
| | vivid blue | 000 | 146 | 224 |
| ⋮ | ⋮ | ⋮ | ⋮ | ⋮ |
| | vivid reddish purple | 255 | 000 | 162 |
| ⋮ | ⋮ | ⋮ | ⋮ | ⋮ |
| | white | 255 | 255 | 255 |
| ⋮ | ⋮ | ⋮ | ⋮ | ⋮ |
| | black | 000 | 000 | 000 |

FIG. 6
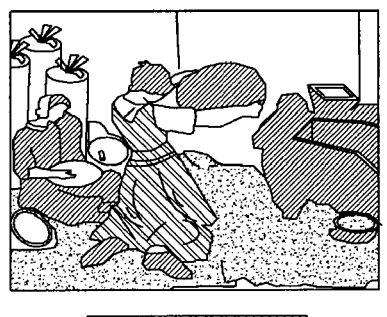
(a)
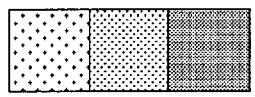
(b)
(c)
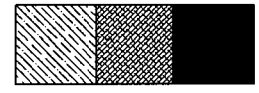
(d)

(a)            (b) COLORS AS CHANGED

DIGITAL IMAGE PROCESSING APPARATUS CAPABLE OF DISPLAYING COLOR DISTRIBUTION CHART AND METHOD OF OPERATING THE SAME

CROSS-REFERENCE TO RELATED PATENT APPLICATION

This application claims the benefit of Korean Patent Application No. 10-2007-0106736, filed on Oct. 23, 2007 in the Korean Intellectual Property Office, the entire contents of which is incorporated herein by reference.

BACKGROUND OF THE INVENTION

1. Field of the Invention

The present invention relates to a digital image processing apparatus and a method of operating the apparatus. More particularly, the present invention relates to a digital image processing apparatus which can calculate and display a color distribution chart of a displayed image and change colors of the displayed image into optimized colors, and a method of operating the apparatus.

2. Description of the Related Art

When photographing an object, a digital image processing apparatus adjusts a white balance by focusing on the object observed by the naked eye or adjusts the colors of an image to colors selected by a user so as to obtain a desired image.

Since the colors of a famous painting or photograph may be well-harmonized, a viewer of these may likely have the impression that the painting or picture is harmonious. However, there are many users that may lack a technical knowledge of color schemes, and if the colors of a real image to be photographed are not well harmonized, it is difficult for such users to take a photograph of an image with harmonious coloring.

SUMMARY OF THE INVENTION

The present invention provides a digital image processing apparatus which can calculate a color distribution chart of a displayed image and display the color distribution chart on a portion of the image, and a method of operating the apparatus.

Also, the present invention provides a digital image processing apparatus which can calculate a color distribution chart of a displayed image and an optimized color distribution chart related with the color distribution chart and display both charts on a portion of the image and change the colors of the displayed image into optimized colors, and a method of operating the apparatus.

According to an embodiment of the present invention, a digital image processing apparatus is provided. The digital image processing apparatus includes a digital signal processing unit which detects digital color signals from an image input via an image photographing unit and calculates a color distribution chart that indicates a proportion of the detected color signals in the image.

The digital signal processing unit may display the calculated color distribution chart of the image on a portion of a displayed image.

The digital signal processing unit may include: a memory for storing a color information table; a search portion for searching for color information corresponding to a color signal of the image input via the image photographing unit from the memory; and a color distribution chart calculation portion for calculating a color distribution chart of a main color signal and sub-color signals of the image based on the searched color information.

The color distribution chart calculation portion may calculate a color distribution chart of pixel-unit color signals of the entire image.

According to another embodiment of the present invention, a digital image processing apparatus is provided in which the digital image processing apparatus includes a digital signal processing unit which:

converts an image input via an image photographing unit into digital color signals to calculate a color distribution chart that indicates a proportion of the converted digital color signals in the image; and searches for color arrangement information, which is the most similar to the calculated color distribution chart, from optimized color arrangement information for a color stored in the memory and changing colors of the image.

The digital signal processing unit may include: a memory for storing a color information table and an optimized color arrangement information table for arbitrary colors; a search portion for searching for color information corresponding to a color signal of the image from the color information table stored in the memory and searching optimized color arrangement information corresponding to the color signal of the image from the color distribution information table stored in the memory; a color distribution chart calculation portion for calculating a color distribution chart of a main color signal and sub-color signals of the image based on the searched color information and calculating an optimized color distribution chart of the main color signal and the sub-color signals of the image based on the searched optimized color information; and a color change unit for changing the colors of the image into the optimized colors in response to the selection signal.

The color distribution chart calculation portion may calculate a color distribution chart of pixel-unit color signals of the entire image.

The color distribution chart calculation portion may display the color distribution chart and the optimized color distribution chart at the same time in an arbitrary region of the displayed image.

According to yet another embodiment of the present invention, a method of operating a digital image processing apparatus storing a color information table is provided. The method includes: searching for color information corresponding to a color signal of an image input via an image photographing unit; and calculating a color distribution chart of a main color signal and sub-color signals of the image based on the searched color information.

The method may further include displaying the calculated color distribution chart of the color signals on a portion of a displayed image.

The calculation of the color distribution chart may include calculating a color distribution chart of pixel-unit color signals of the entire image.

According to a further embodiment of the present invention, a method of operating a digital image processing apparatus is provided. The method includes: calculating a color distribution chart of an image input via an image photographing unit; calculating an optimized color distribution chart of the image; and changing colors of the image into optimized colors in response to a selection signal.

A color distribution chart of pixel-unit color signals of the entire image may be calculated.

At least one of the calculated color distribution chart and the calculated optimized color distribution chart may be displayed in an arbitrary region of the image.

The digital image processing apparatus may store a color information table and an optimized color arrangement information table for arbitrary colors.

The calculation of the color distribution chart of the image may include: searching for color information corresponding to a color signal of the image from the color information table; and calculating a color distribution chart of main color signal and sub-color signals of the image based on the searched color information.

The calculation of the optimized color distribution chart of the image may include: searching for optimized color arrangement information corresponding to the color signal of the image from the color arrangement information table; and calculating an optimized color distribution chart of the main color signal and the sub-color signals of the image based on the optimized color arrangement information.

BRIEF DESCRIPTION OF THE DRAWINGS

The above and other features and advantages of the present invention will become more apparent by describing in detail exemplary embodiments thereof with reference to the attached drawings in which:

FIG. 5 is a diagram showing an example of a color information table stored in a memory of each of the digital image processing apparatuses shown in FIGS. 3 and 4;

FIGS. 6A through 6D are diagrams for explaining examples of an optimized color arrangement information table stored in the memory of the digital image processing apparatus shown in FIG. 4;

DETAILED DESCRIPTION OF THE INVENTION

Hereinafter, exemplary embodiments of the present invention will be described in detail with reference to the attached drawings.

Figure 1:
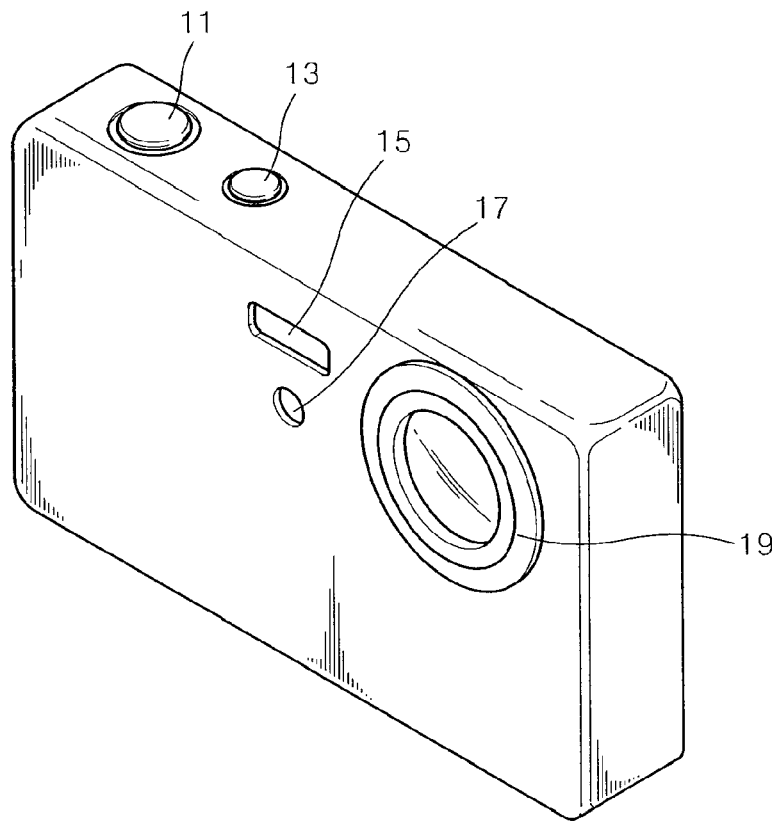
FIG. 1 is a perspective view of an example of a front side and a top side of a digital image processing apparatus according to an embodiment of the present invention.

FIG. 1 is a perspective view of an example of a front side and a top side of a digital image processing apparatus according to an embodiment of the present invention.

Referring to the example of FIG. 1, the digital image processing apparatus includes a shutter-release button 11, a power button 13, a flash 15, a sub-light 17, and a lens 19. When the power button 13 is pressed, power is supplied to the digital image processing apparatus so that the digital image processing apparatus can operate. In this state, when the shutter-release button 11 is pressed, a charge-coupled device (CCD) (not shown) is exposed to light for a predetermined time via an iris diaphragm (not shown) and the lens 19 so that an image of a subject to be photographed is recorded in the CCD.

When the shutter-release button 11 is pressed by a user, first and second image photographing signals are generated. When at first the shutter-release button 11 is half-pressed, the digital image processing apparatus adjusts the focus and controls the amount of light entering the lens 19. In this case, when the focus is properly adjusted, a green light lights up on a display unit 23 of FIG. 2. After the focus is adjusted and the amount of light is controlled by half-pressing the first shutter-release button 11, the shutter-release button 11 is then fully-pressed to photograph the subject.

The flash 15 is used to illuminate the subject and surroundings when photographing takes place in a dark place. Flash modes include, for example, an automatic mode, a forced flash mode, a flash-off mode, a red-eye reduction mode, and a slow-sync flash mode.

The sub-light 17 supplies light to the subject so that in the situation of a lack of light or night photography, the digital image processing apparatus can still automatically adjust the focus in a rapid and accurate way.

The lens 19 receives light bouncing off the subject and processes an image of the subject.

Figure 2:
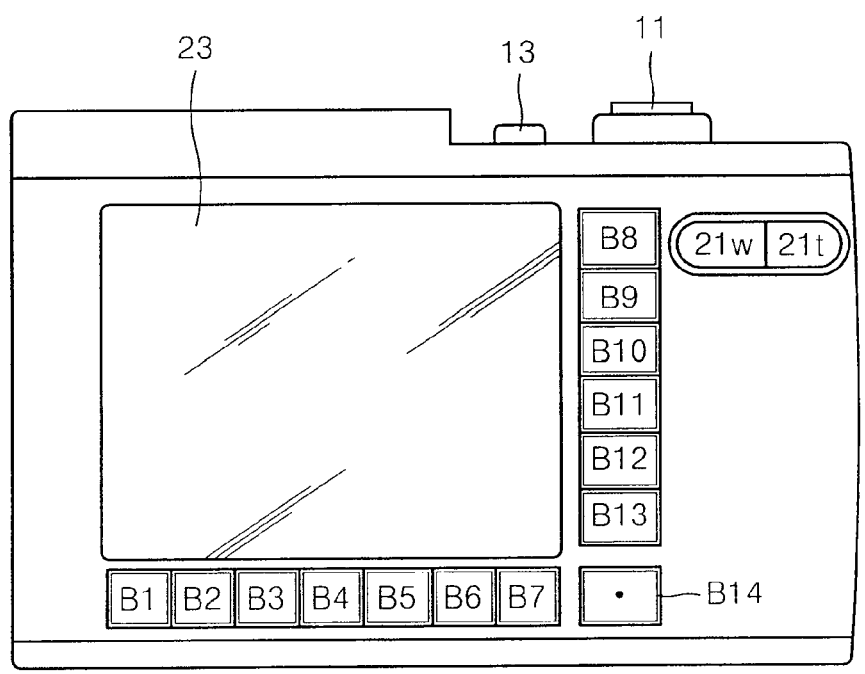
FIG. 2 is a view of an example of a back side of the digital image processing apparatus shown in FIG. 1.

FIG. 2 is a view of an example of a back side of the digital image processing apparatus shown in FIG. 1.

Referring to the example of FIG. 2, the digital image processing apparatus further includes a wide-angle zoom button 21w, a telephoto zoom button 21t, a display unit 23, and input buttons B1 to B14. Each input button may include a touch sensor or a contact switch (not shown).

The wide-angle zoom button 21w or the telephoto zoom button 21t is pressed to respectively increase or decrease an angle of view, thereby changing the size of a selected region to be photographed. When the wide-angle zoom button 21w is pressed, the size of the selected region is reduced. When the telephoto zoom button 21t is pressed, the size of the selected region is enlarged.

The buttons B1 to B14 are arranged in a column and a row beside the display unit 23 in this example.

If the touch sensor is included in the input buttons B1 through B14, an arbitrary item, for example, color or brightness, among main menu items, or a sub menu icon included in a main menu icon may be selected by moving the horizontally aligned buttons B1 through B7 or the vertically aligned buttons B8 through B14 in all directions while pressing the horizontally aligned buttons B1 through B7 or the vertically aligned buttons B8 through B14.

If each of the buttons B1 to B14 includes a contact switch, a main menu icon and a sub-menu icon can be directly selected to perform a desired function. When touch sensors are used, the operating force is smaller than the operating force for contact switches, for example.

Figure 3:
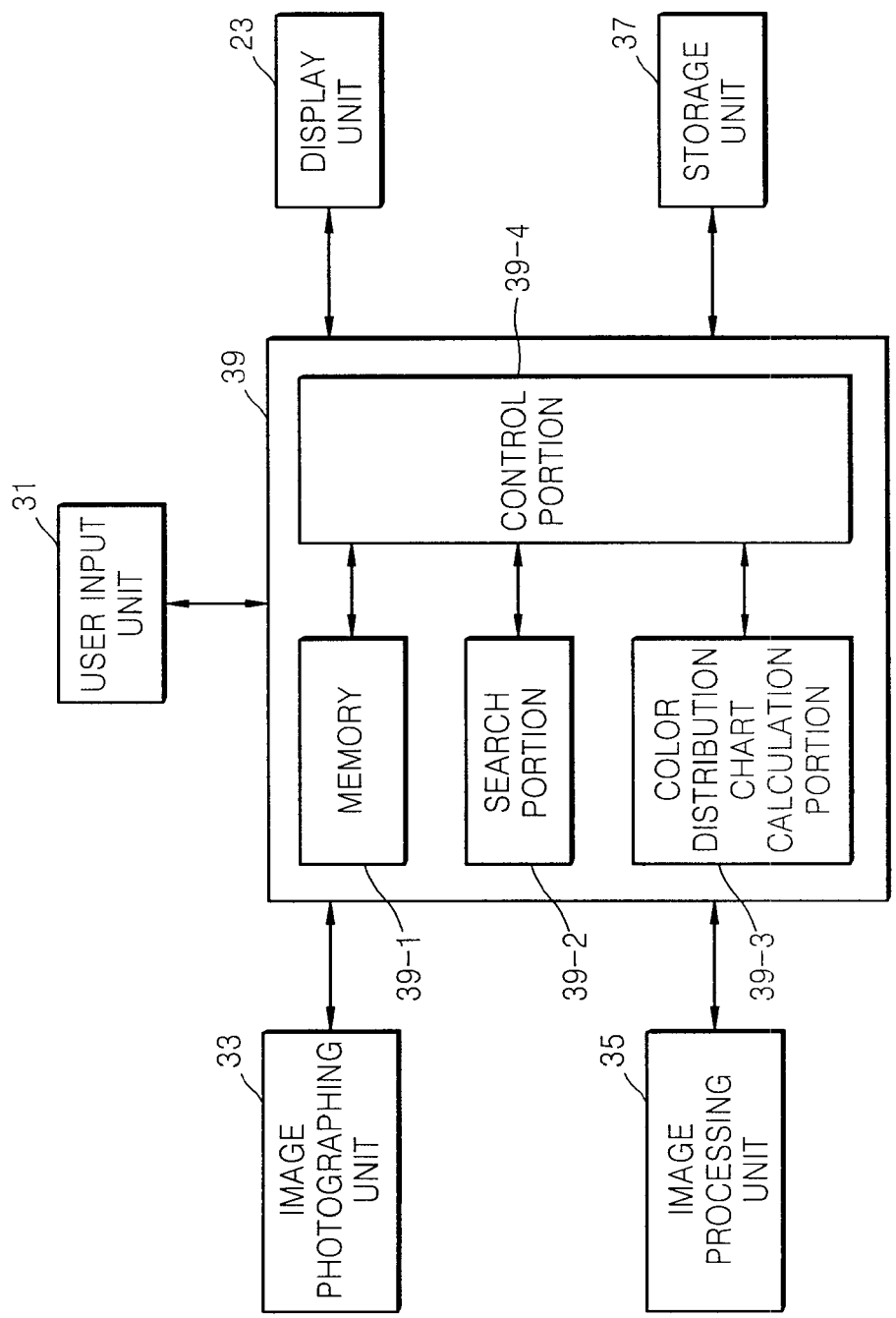
FIG. 3 is a block diagram of an example of a digital image processing apparatus capable of displaying a color distribution chart according to an embodiment of the present invention.

FIG. 3 is a block diagram of an example of a digital image processing apparatus capable of displaying a color distribution chart according to an embodiment of the present invention.

Referring to the example of FIG. 3, the digital image processing apparatus includes a display unit 23, a user input unit 31, an image photographing unit 33, an image processing unit 35, a storage unit 37, and a digital signal processing unit 39. In the present embodiment, the digital signal processing unit 39 includes a memory 39-1, a search portion 39-2, a color distribution chart calculation portion 39-3, and a control portion 39-4.

The user input unit 31 includes a shutter-release button 11, a power button 13, a wide-angle zoom button 21w and a telephoto zoom button 21t, and buttons B1 to B14. The shutter-release button 11 is operated to expose a CCD to light for a predetermined time. The power button 13 is pressed to supply power to the digital image processing apparatus. The wide-angle zoom button 21w or the telephoto zoom button 21t is pressed to increase or decrease an angle of view. The buttons B1 to B14 are arranged in a row and a column beside the display unit 23. Each of the buttons B1 to B14 may include a touch sensor (not shown) or a contact switch (not shown), for example.

The image photographing unit 33 includes, for example, a shutter, a lens, an iris diaphragm, the CCD, and an analog-to-digital converter (ADC), although they are not shown. The shutter is a component that controls the amount of light entering the lens and the iris diaphragm. The lens receives light bouncing off a subject to be photographed and processes an image of the subject. In this case, the amount of light is controlled according to an opening extent of the iris diaphragm, which is regulated by the digital signal processing unit 39.

The CCD accumulates light received via the lens and outputs an image on the display unit 23 according to the amount of accumulated light in response to a vertical synchronizing signal. The CCD converts light reflected by a subject to be photographed into an electric signal. In order to obtain a color image using the CCD, a color filter is included in the digital image processing apparatus of the present invention. The color filter may be a color filter array (CFA). The CFA includes regularly arranged pixels, each pixel allowing only single-color light to pass therethrough, and may have various shapes according to the type of arrangement of pixels. The ADC converts an analog image signal output from the CCD into a digital signal.

The image processing unit 35 processes raw digital data so as to display the data. The image processing unit 35 removes a black level caused by a dark current generated in the CCD and CFA, which are sensitive to temperature variations The image processing unit 35 gamma encodes data in conformity with: nonlinearity of a human's eyesight. The image processing unit 35 converts a Bayer pattern embodied by an RGRG line and a GBGB line of the gamma encoded data into an RGB line using CFA interpolation. The image processing unit 35 converts an interpolated RGB signal into a YUV signal, performs an edge compensation process of filtering a Y signal using a high pass filter (HPF) to process an image clearly, performs a color correction process of correcting color values of U and V signals using a normal color coordinate system, and eliminates noise from Y, U, and V signals. The image processing unit 35 compresses and processes the Y, U, and V signals, from which noise is eliminated, to generate a joint photographic coding experts group (JPEG) file, and the generated JPEG file is displayed on the display unit 23 and stored in the storage unit 37. The above-described operations of the image processing unit 35 are controlled by the digital signal processing unit 39.

The digital signal processing unit 39 calculates a color distribution chart of the RGB signal obtained by CFA interpolation in the image processing unit 35 and displays the color distribution chart on a portion of a real image. For this, the digital signal processing unit 39 includes, for example, the memory 39-1, the search portion 39-2, the color distribution chart calculation portion 39-3, and the control portion 39-4.

The memory 39-1 stores a color information table. FIG. 5 is a diagram showing an example of a color information table stored in a memory of each of the digital image processing apparatuses shown in FIGS. 3 AND 4. FIG. 5 illustrates an example of the color information table stored in the memory 39-1, for example. The color information table indicates colors corresponding to respective systematic color names and the color information table stores red (R), green (G), and blue (B) values for such respective colors, for example.

The search portion 39-2 searches for color information corresponding to the RGB signal of the real image displayed on the display unit 23 from the memory 39-1. In particular, the search portion 39-2 searches for color information corresponding to a pixel-unit RGB signal of the real image from the memory 39-1.

The color distribution chart calculation portion 39-3 calculates a distribution chart of a main color signal and sub-color signals of the real image based on the color information searched by the search portion 39-2 and outputs the distribution chart to the control portion 39-4.

The control portion 394 controls the operations of the memory 39-1, the search portion 39-2, and the color distribution chart calculation portion 39-3. In particular, the control portion 39-4 controls the color distribution chart of the main and sub-color signals output from the color distribution chart calculation portion 39-3 to be displayed on the display unit 23.

Figure 4:
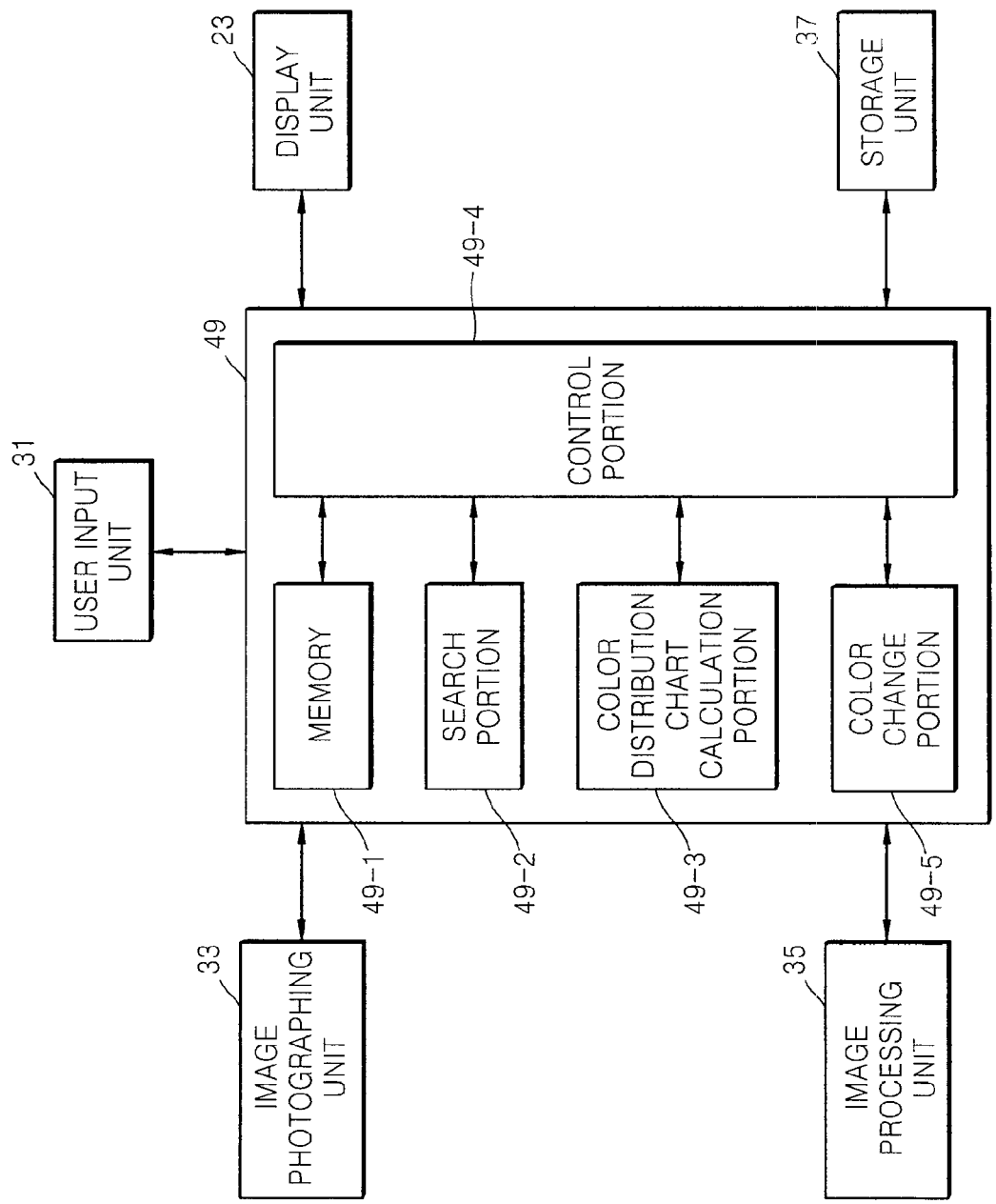
FIG. 4 is a block diagram of an example of a digital image processing apparatus capable of displaying a color distribution chart according to another embodiment of the present invention.
Figure 7:
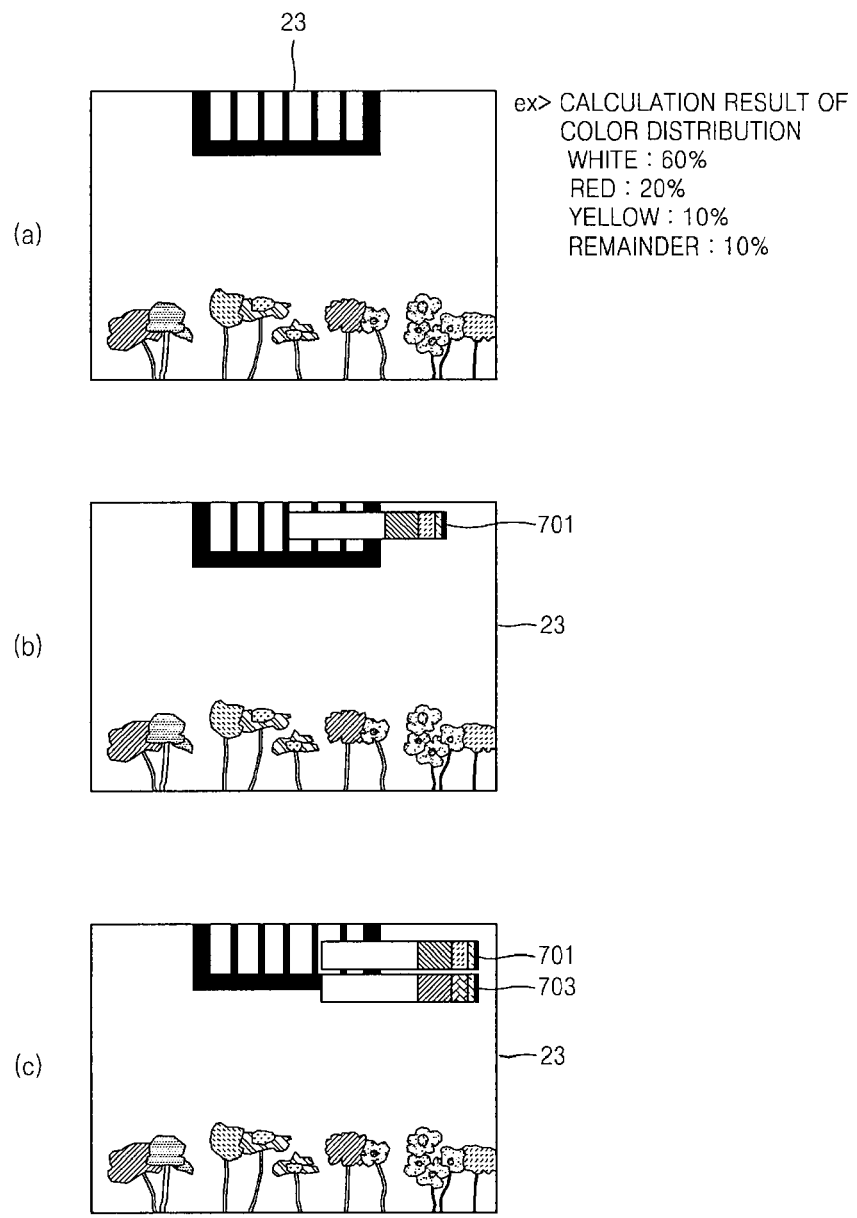
FIGS. 7A through 7C are diagrams for explaining an example of a color distribution chart of an image processed in each of the digital image processing apparatuses shown in FIGS. 3 and 4.

FIGS. 7A through 7C are diagrams for explaining an example of a color distribution chart of an image processed in each of the digital image processing apparatuses shown in FIGS. 3 and 4. FIGS. 7A and 7B are diagrams for explaining a color distribution chart of an image processed in the digital image processing apparatus shown in FIG. 3, for example.

FIG. 7A shows a real image, which is displayed on the display unit 23, and a calculation result of a color distribution chart of main and sub-color signals of the real image, which is obtained by the color distribution chart calculation portion 39-3. Referring to the real image of FIG. 7A, the color distribution chart calculation portion 39-3 calculates that the main color signal (or white) (e.g., R:255, G:255, B:255 in FIG. 5) takes up to 60%, a first sub-color signal (or red) (e.g., R:248, G:000, B:064 in FIG. 5) takes up to 20%, a second sub-color signal (or yellow) (e.g., R:249, G:204, B:088 in FIG. 5) takes up to 10%, and the other sub-color signal takes up to 10%, for example.

FIG. 7B shows the calculation result of the color distribution chart, which is displayed as a type of a bar 701 in an arbitrary region of the displayed real image by the control portion 39-4 that receives the color distribution chart. Accordingly, a user can confirm the color distribution chart of the real image.

FIG. 4 is a block diagram of an example of a digital image processing apparatus capable of displaying a color distribution chart according to another embodiment of the present invention.

Referring to the example of FIG. 4, the digital image processing apparatus according to the current embodiment includes a display unit 23, a user input unit 31, an image photographing unit 33, an image processing unit 35, a storage unit 37, and a digital signal processing unit 49. In the present embodiment, the digital signal processing unit 49 includes a memory 49-1, a search portion 49-2, a color distribution chart calculation portion 49-3, a control portion 49-4, and a color change portion 49-5. The display unit 23, the user input unit 31, the image photographing unit 33, the image processing unit 35, and the storage unit 37 are the same as described with reference to FIG. 3, and thus the description of such will not be now repeated.

In comparison with the digital image processing apparatus of FIG. 3 that displays only the color distribution chart of the real image, the digital image processing apparatus of FIG. 4 displays not only a color distribution chart of a real image but also an optimized color distribution chart and allows a user to change colors of the real image into optimized colors.

Referring to the example of FIG. 4, the digital signal processing unit 49 calculates a color distribution chart of an RGB signal obtained by CFA interpolation in the image processing unit 35. Also, the digital signal processing unit 49 calculates an optimized color distribution chart of the RGB signal obtained by interpolating the CFA in the image processing unit 35 and displays the optimized color distribution chart on a portion of a live-view image. Thereafter, the digital signal processing unit 49 receives a user selection signal and changes the initial real image into a new real image with an optimized color arrangement.

For these features, the digital signal processing unit 49 includes the memory 49-1, the search portion 49-2, the color distribution chart calculation portion 49-3, the control portion 49-4, and the color change portion 49-5.

The memory 49-1 is divided into first and second regions. For example, a color information table is stored in the first region, while an optimized color arrangement information table for arbitrary colors is stored in the second region.

FIG. 5 illustrates an example of the color information table stored in the first region of the memory 49-1. In the color information table, colors corresponding to respective systematic color names are indicated and R, G, and B values of such colors are respectively stored.

FIGS. 6A through 6D are diagrams for explaining examples of an optimized color arrangement information table stored in the second region of the memory 49-1. The optimized color arrangement information table contains arrangement information on various colors according to the similarity, familiarity, unambiguity, contrast, and order. Similarity refers to harmony of analogous colors. Familiarity refers to harmony of colors with common properties and attributes. Unambiguity refers to classifying clearly colors when arranging them. Contrast refers to the arrangement of colors with opposite colors or complementary colors. Order refers to arranging the colors concretely and systematically.

FIG. 6A shows the painting "The Wheat Sifters" of Gustave Courbet. Referring to FIG. 6, the oil painting has opposite colors with low chromas so it has the feeling of a subdued and heavy image and looks stable. In this case, the optimized color arrangement information table stores arrangement information on the low-chroma opposite colors shown in FIG. 6A.

FIG. 6B shows the painting "The window" of Gyu-Baek Hwang, a Korean painter. Referring to FIG. 6B, beautiful gradations of analogous colors are shown in the glowing sky and sun setting portions. In this case, the optimized color arrangement information table stores arrangement information on the gradations of the analogous colors shown in FIG. 6B.

FIG. 6C shows a typical fashion picture in which a chromatic color is highlighted among achromatic colors to produce a clear contrast and a dynamic effect. In this case, the optimized color arrangement information table stores arrangement information on the chromatic color highlighted among the achromatic colors shown in FIG. 6C.

FIG. 6D shows another fashion picture in which analogous colors including blue and indigo are arranged to make a stable impression. In this case, the optimized color arrangement information table stores arrangement information on the analogous colors shown in FIG. 6D.

Referring again to FIG. 4, the search portion 49-2 performs two search operations. First, the search portion 49-2 searches for color information corresponding to the RGB signal of the real image displayed on the display unit 23 from the color information table stored in the first region of the memory 49-1. Second, the search portion 49-2 searches for optimized color information corresponding to the RGB signal of the real image displayed on the display unit 23 from the optimized color arrangement information table stored in the second region of the memory 49-1. In particular, the search portion 49-2 searches for color information and optimized color arrangement information corresponding to a pixel-unit RGB signal of the real image from the memory 49-1.

The color distribution chart calculation portion 49-3 also calculates two color distribution charts. First, the color distribution chart calculation portion 49-3 calculates a distribution chart of a main color signal and sub-color signals of the real image based on the color information searched by the search portion 49-2 and outputs the distribution chart to the control portion 49-4. Second, the color distribution chart calculation portion 49-3 calculates an optimized color arrangement distribution chart of a main color signal and sub-color signals of the real image based on the optimized color arrangement information that the search portion 49-2 searched for and outputs the optimized color arrangement distribution chart to the control portion 49-4.

The control portion 49-4 controls the color distribution chart of the main and sub-color signals output from the color distribution chart calculation portion 49-3 to be displayed on the display unit 23. Also, the control portion 49-4 controls the optimized color arrangement distribution chart of the main and sub-color signals output from the color distribution chart calculation portion 49-3 to be displayed on the display unit 23. The control portion 49-4 controls the color distribution chart of the real image and the optimized color arrangement distribution chart of the live-view image to be displayed at the same time and allows a user to see the two charts and determine if the colors of the real image are to be changed or not.

When the user inputs a selection signal via the user input unit 31 to change the colors of the real image into optimized colors, the color change portion 49-5 receives the selection signal and changes the colors of the live-view image into the optimized colors. The color change portion 49-5 changes R, G, and B values of the real image into optimized R, G, and B values.

Figure 8:
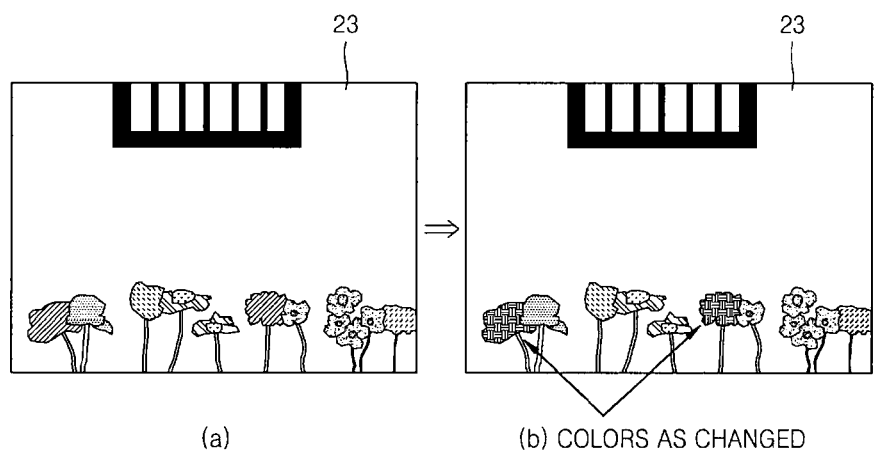
FIGS. 8A and 8B are diagrams for explaining an example of an image of which colors are changed into optimized colors in the digital image processing apparatus shown in FIG. 4.

FIGS. 7A through 7C are diagrams for explaining an example of a color distribution chart of an image processed in the digital image processing apparatus shown in FIG. 4, and FIGS. 8A and 8B are diagrams for explaining an example of an image of which colors are changed into optimized colors in the digital image processing apparatus shown in FIG. 4.

FIG. 7A shows a real image, which is displayed on the display unit 23, and a calculation result of a color distribution chart of main and sub-color signals of the live-view image, which is obtained by the color distribution chart calculation portion 49-3. Referring to the live-view image of FIG. 7A, the color distribution chart calculation portion 49-3 calculates that a main color signal (or white) (e.g., R:255, G:255, B:255 in FIG. 5) takes up to 60%, a first sub-color signal (or red) (e.g., R:248, G:000, B:064 in FIG. 5) takes up to 20%, a second sub-color signal (or yellow) (e.g., R:249, G:204, B:088 in FIG. 5) takes up to 10%, and the other sub-color signal takes up to 10%, for example.

FIG. 7B shows the calculation result of the color distribution chart, which is displayed as a type of a bar 701 in an arbitrary region of the displayed live-view image by the control portion 49-4 that receives the color distribution chart.

FIG. 7C shows the bar-type color distribution chart 701 and a bar-type optimized color arrangement distribution chart 703, which are displayed in an arbitrary region of the displayed real image by the control portion 49-4 that receives the optimized color arrangement distribution chart.

FIG. 8A shows an initially displayed real image, and FIG. 8B shows an image displayed on the display unit 23 by changing the colors of the real image into optimized colors in the color change portion 49-5 according to user's selection.

Hereinafter, examples of methods of operating a digital image processing apparatus capable of displaying a color distribution chart according to embodiments of the present invention will be described in detail with reference to FIGS. 9 and 10. The method of operating the digital image processing apparatus capable of displaying the color distribution chart according to the present invention may be performed in the digital image processing apparatuses shown in FIGS. 3 and 4. The main algorithm for controlling operations according to the embodiments of the present invention may be performed in the digital signal processing units 39 and 49 shown in FIGS. 3 and 4, respectively, by use of peripheral components included in a control portion.

To begin with, an example of a method of operating a digital image processing apparatus capable of displaying a color distribution chart according to an embodiment of the present invention will be described in detail with reference to FIGS. 3 and 9.

In operation 901, a real image is displayed on the display unit 23. When a user pushes the power button 13 to supply power to the digital image processing apparatus, the digital image processing apparatus begins to operate and enters a photographing mode, so that the real image is displayed on the display unit 23.

Thereafter, the search portion 39-2 searches for color information corresponding to an RGB signal of the real image from the memory 39-1 that stores the color information table in operation 903. Since the color information table stored in the memory 39-1 is described with reference to FIG. 5, the description thereof will not be repeated here. The search portion 39-2 searches for color information corresponding to a pixel-unit RGB signal of the live-view image from the memory 39-1.

After the search operation is finished, the color distribution chart calculation portion 39-3 calculates a color distribution chart of the real image based on the search result in operation 905. The color distribution chart calculation portion 39-3 calculates a color distribution chart of a main color signal and sub-color signals of the real image based on the searched color information and outputs the color distribution chart to the control portion 39-4. FIG. 7A illustrates an example of the color distribution chart calculated by the color distribution chart calculation portion 39-3.

In operation 907, the control portion 39-4 displays the calculated color distribution chart in an arbitrary position of the real image. The control portion 39-4 displays the color distribution chart in the shape of a bar 701 in an arbitrary region of the displayed real image as illustrated in FIG. 7B.

Hereinafter, an example of a method of operating a digital image processing apparatus capable of displaying a color distribution chart according to a second embodiment of the present invention will be described in detail with reference to FIGS. 4 and 10.

Figure 9:
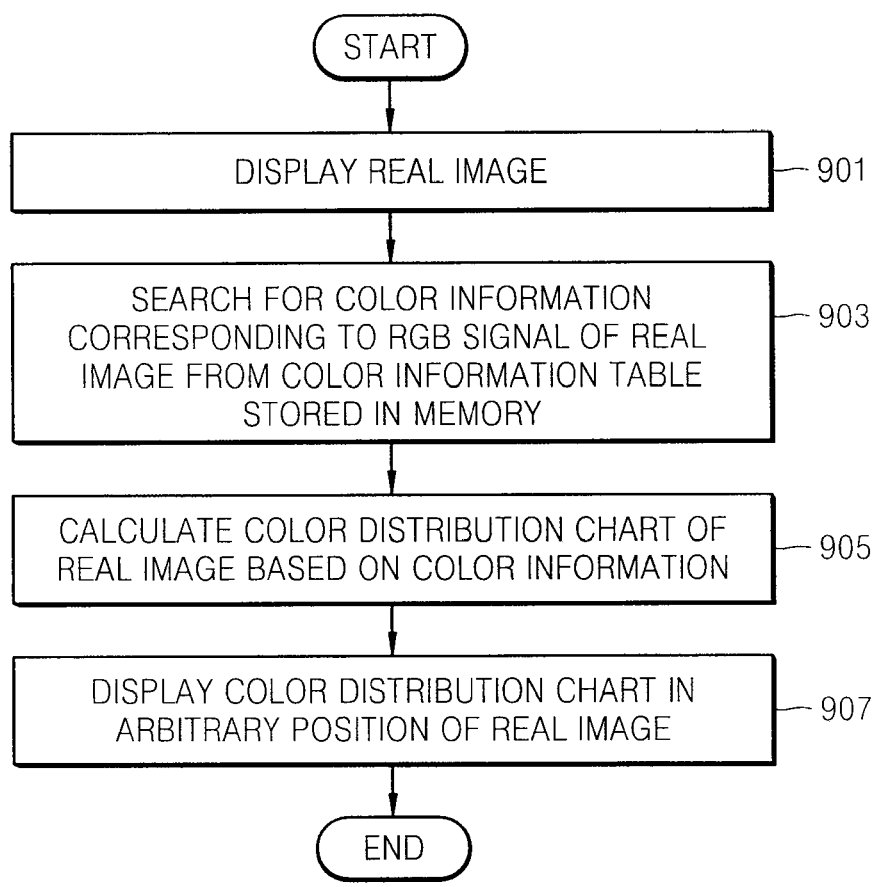
FIG. 9 is a flowchart illustrating an example of a method of operating a digital image processing apparatus capable of displaying a color distribution chart according to an embodiment of the present invention.
Figure 10:
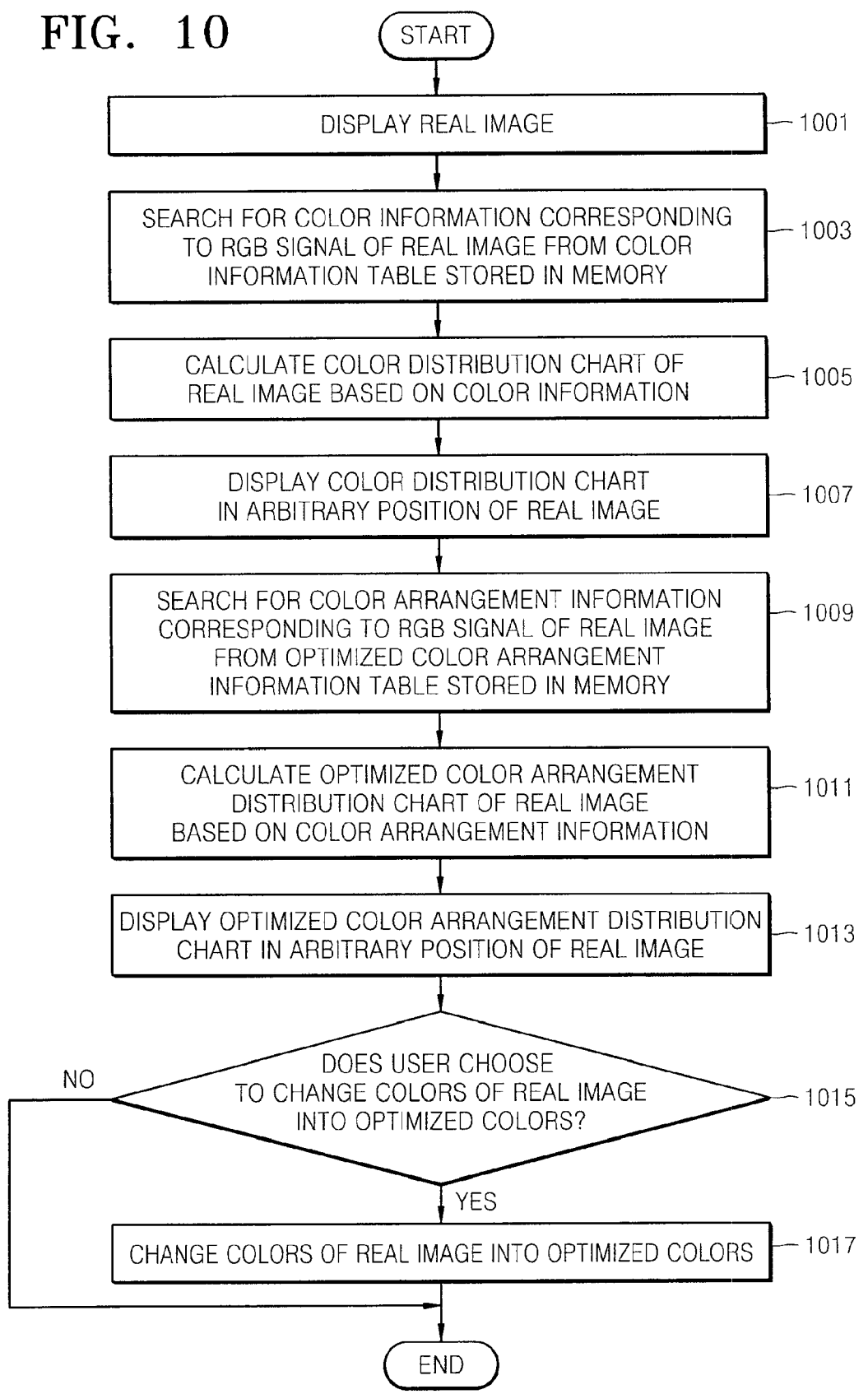
FIG. 10 is a flowchart illustrating an example of a method of operating a digital image processing apparatus capable of displaying a color distribution chart according to another embodiment of the present invention.

In comparison with the method shown in FIG. 9 that displays only the color distribution chart of the real image, in the method shown in FIG. 10, a color distribution chart of a real image and an optimized color arrangement distribution chart thereof are displayed at the same time, thus allowing a user to change colors of the real image into optimized colors.

In operation 1001, a live-view image is displayed on the display unit 23. When a user presses the power button 13 to supply power to the digital image processing apparatus, the digital image processing apparatus begins to operate and enters a photographing mode, so that the real image is displayed on the display unit 23.

Thereafter, the search portion 49-2 searches for color information corresponding to an RGB signal of the real image from the memory 49-1 that stores the color information table in operation 1003. In the present embodiment, the memory 49-1 is divided into the first and second regions. The color information table is stored in the first region, while the optimized color arrangement information table for arbitrary colors is stored in the second region. Since the color information table and the optimized color arrangement information table stored in the memory 49-1 are described with reference to FIGS. 5 and 6, a description thereof will not be repeated here. The search portion 49-2 searches for color information corresponding to a pixel-unit RGB signal of the live-view image from the color information table stored in the first region of the memory 49-1.

After the search operation is finished, the color distribution chart calculation portion 49-3 calculates a color distribution chart of the real image based on the search result in operation 1005. The color distribution chart calculation portion 49-3 calculates a color distribution chart of a main color signal and sub-color signals of the real image based on the searched color information and outputs the color distribution chart to the control portion 49-4. FIG. 7A illustrates an example of the color distribution chart calculated by the color distribution chart calculation portion 49-3.

In operation 1007, the control portion 49-4 displays the calculated color distribution chart in an arbitrary position of the real image. The control portion 49-4 displays the color distribution chart in the shape of a bar 701 in an arbitrary region of the displayed real image as illustrated in FIG. 7B.

After the calculated color distribution chart is displayed on the display unit 23, the search portion 49-2 searches for optimized color information corresponding to the RGB signal of the real image from the memory 49-1 that stores the optimized color arrangement information table in operation 1009. The search portion 49-2 searches for optimized color arrangement information corresponding to the pixel-unit RGB signal of the real image from the optimized color arrangement information table stored in the second region of the memory 49-1.

After the search operation is finished, the color distribution chart calculation portion 49-3 calculates an optimized color arrangement distribution chart of the live-view image based on the search result in operation 1011. The color distribution chart calculation portion 49-3 calculates an optimized color arrangement distribution chart of the main color signal and the sub-color signals of the real image based on the searched optimized color arrangement information and outputs the optimized color arrangement distribution chart to the control portion 49-4.

In operation 1013, the control portion 49-4 displays the calculated optimized color arrangement distribution chart in an arbitrary position of the real image. The control portion 49-4 displays the optimized color arrangement distribution chart in the shape of a bar 703 in an arbitrary region of the displayed real image as illustrated in FIG. 7C. FIG. 7C shows the bar-type color distribution chart 701 and the bar-type optimized color arrangement distribution chart 703, which are displayed in an arbitrary region of the displayed real image by the control portion 49-4 that receives the optimized color arrangement distribution chart.

In operation 1015, a user sees the color distribution chart and the optimized color arrangement distribution chart of the real image and determines if the colors of the real image are to be changed into optimized colors.

When the user chooses to change the colors of the real image into the optimized colors, the color change portion 49-5 receives a user input signal and changes the colors of the real image into the optimized colors in operation 1017. The color change portion 49-5 changes R, G, and B values of the real image into optimized R, G, and B values. FIG. 8B shows an example of the image displayed on the display unit 23 by changing the colors of the real image into the optimized colors in the color change portion 49-5 according to user's selection.

According to the present invention as described above, a color distribution chart and an optimized color distribution chart of a displayed image are calculated and displayed on a portion of the image, and colors of the displayed image can be changed into optimized colors, thereby permitting a user to take a photograph of an image with a harmonious color arrangement.

While the present invention has been particularly shown and described with reference to exemplary embodiments thereof, it will be understood by those of ordinary skill in the art that various changes in form and details may be made therein without departing from the spirit and scope of the present invention as defined by the following claims.

What is claimed is:

1. A digital image processing apparatus comprising a digital signal processing unit that at least detects digital color signals in an image input via an image photographing unit and calculates a color distribution chart for the image that represents a statistical distribution of the digital color signals across the entire image, wherein the digital signal processing unit comprises:
    a memory for storing a color information table;
    a search portion to obtain color information corresponding to the digital color signals in the image;
    a color distribution chart calculation portion for calculating the color distribution chart for the image based on the obtained color information and an optimized color arrangement distribution chart for the image based on optimized color arrangement information corresponding to the digital color signals from a color distribution information table that contains color distributions based on images predefined as having desirable color distributions in terms of similarity, familiarity, unambiguity, contrast, and order; and
    a display unit to display the image,
    wherein the digital signal processing unit overlays the calculated color distribution chart and the optimized color arrangement distribution chart on the displayed image.

2. The apparatus of claim 1, wherein the color distribution chart calculation portion calculates the color distribution chart to represent pixel-unit color signals.

3. The apparatus of claim 1, wherein the digital signal processing unit changes the colors of the entire image into the optimized color distribution chart by user determination, the user determination being made after the display of the optimized color distribution chart.

4. A digital image processing apparatus comprising a digital signal processing unit that at least:
    converts an image input via an image photographing unit into digital color signals;
    obtains color information corresponding to the digital color signals from a color information table stored in a memory;
    calculates a color distribution chart that represents a statistical distribution of the digital color signals in the image based on the obtained color information;
    obtains optimized color arrangement information corresponding to the digital color signals from a color distribution information table stored in the memory that contains color distributions based on images predefined as having desirable color distributions in terms of similarity, familiarity, unambiguity, contrast, and order;
    obtains color arrangement information that is the most similar to the calculated color distribution chart from the obtained optimized color arrangement information; and
    changes colors of the image according to the color arrangement information.

5. The apparatus of claim 4, wherein the digital signal processing unit comprises:
    the memory;
    a search portion for obtaining the color information corresponding to the digital color signals of the image from the color information table stored in the memory and obtaining the optimized color arrangement information corresponding to the digital color signals of the image from the color distribution information table stored in the memory;
    a color distribution chart calculation portion for calculating the color distribution chart of a main color signal and sub-color signals of the image based on the obtained color information and calculating the optimized color distribution chart of the main color signal and the sub-color signals of the image based on the obtained optimized color information; and
    a color change unit for changing the colors of the image into optimized colors in response to a selection signal.

6. The apparatus of claim 5, wherein the color distribution chart calculation portion calculates the color distribution chart of pixel-unit color signals of the entire image.

7. The apparatus of claim 5, further comprising a display unit to display the image, wherein the color distribution chart calculation portion overlays the color distribution chart and the optimized color distribution chart at the same time on an arbitrary portion of the displayed image.

8. The apparatus of claim 4, wherein:
    similarity is a harmony of analogous colors;
    familiarity is a harmony of colors with common properties and attributes;
    unambiguity is a clear classification of colors;
    contrast is opposite or complementary colors; and
    order is colors organized concretely and systematically.

9. A method of operating a digital image processing apparatus storing a color information table, the method comprising:

obtaining color information corresponding to the pixels of an image input via an image photographing unit;

calculating a color distribution chart for the image based on the obtained color information, the color distribution chart representing a statistical distribution of a main color signal and sub-color signals of the image;

calculating an optimized color arrangement distribution chart for the image based on optimized color arrangement information corresponding to the digital color signals from a color distribution information table that contains color distributions based on images predefined as having desirable color distributions in terms of similarity, familiarity, unambiguity, contrast, and order; and overlaying the calculated color distribution chart and the optimized color arrangement distribution chart on a displayed image on a display unit.

10. The method of claim 9, wherein the calculating of the color distribution chart comprises calculating a color distribution chart of pixel-unit color signals of the entire image.

11. A method of operating a digital image processing apparatus, the method comprising:

calculating a color distribution chart of an image input via an image photographing unit, the color distribution chart representing a statistical distribution of colors of the image;

obtaining color information corresponding to the colors of the image from a color information table;

obtaining optimized color arrangement information that substantially corresponds to the color distribution chart from a color arrangement information table that contains color distributions based on images predefined as having desirable color distributions in terms of similarity, familiarity, unambiguity, contrast, and order;

calculating an optimized color distribution chart of the image based on the obtained optimized color arrangement information; and changing the colors of the image into optimized colors based on the obtained optimized color arrangement information in response to a selection signal.

12. The method of claim 11, wherein the color distribution chart is calculated for pixel-unit color signals of the entire image.

13. The method of claim 11, wherein at least one of the calculated color distribution chart or the calculated optimized color distribution chart is displayed on an arbitrary region of the image.

14. The method of claim 11, wherein the digital image processing apparatus comprises a memory to store the color information table and the optimized color arrangement information table for arbitrary colors.

15. The method of claim 14, wherein the calculating of the color distribution chart of the image comprises calculating a color distribution chart of a main color signal and sub-color signals of the image based on the obtained color information.

16. The method of claim 15, wherein the calculating of the optimized color distribution chart of the image comprises calculating an optimized color distribution chart of the main color signal and the sub-color signals of the image based on the optimized color arrangement information.

* * * * *